Dec. 23, 1952     K. L. HANSEN     2,623,201
SYNCHRONOUS MOTOR
Filed Aug. 5, 1950     3 Sheets-Sheet 1
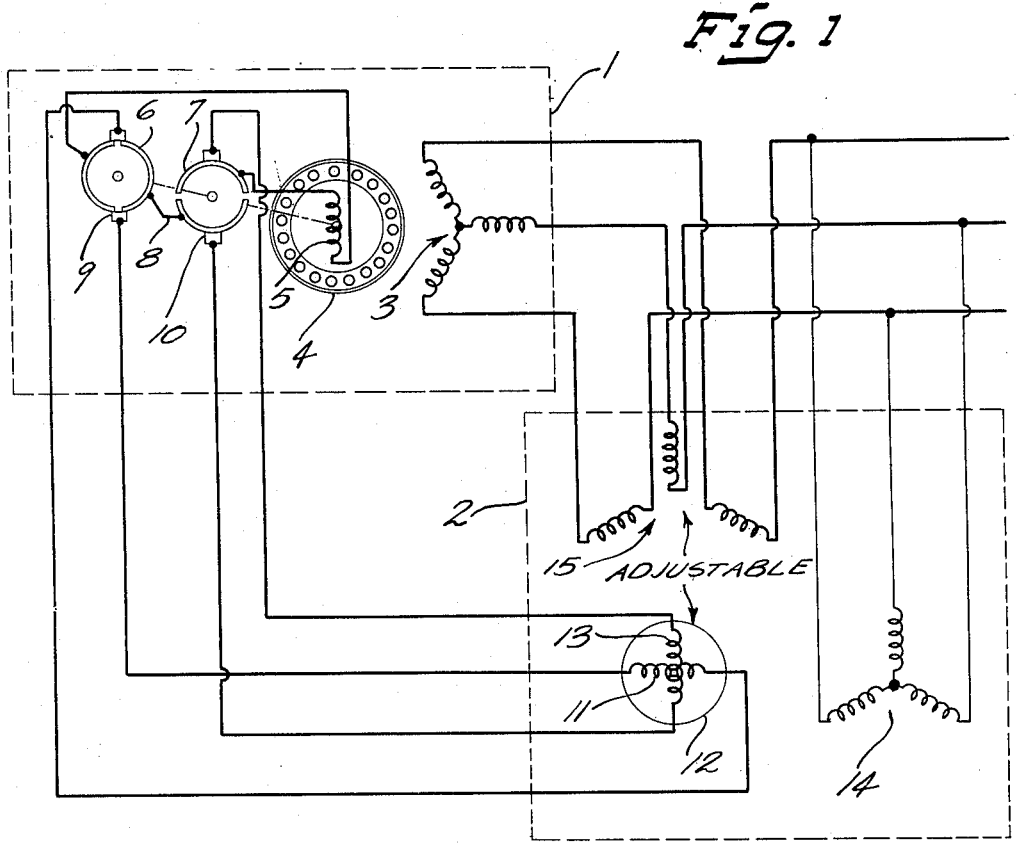
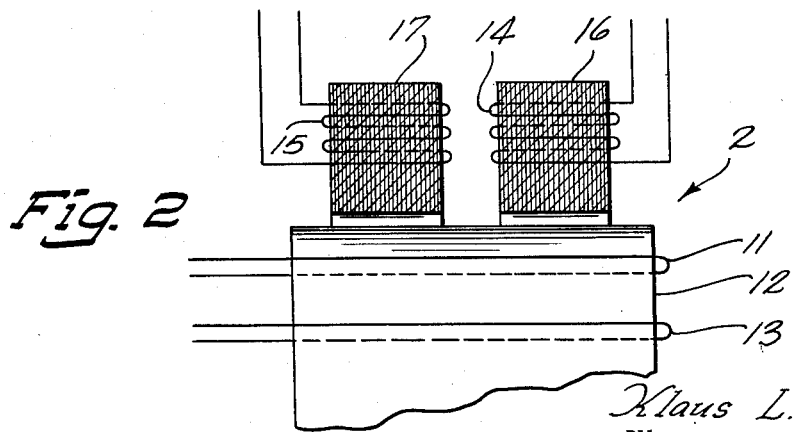
INVENTOR.
Klaus L. Hansen
BY
Arthur R. Woolfolk
Attorney

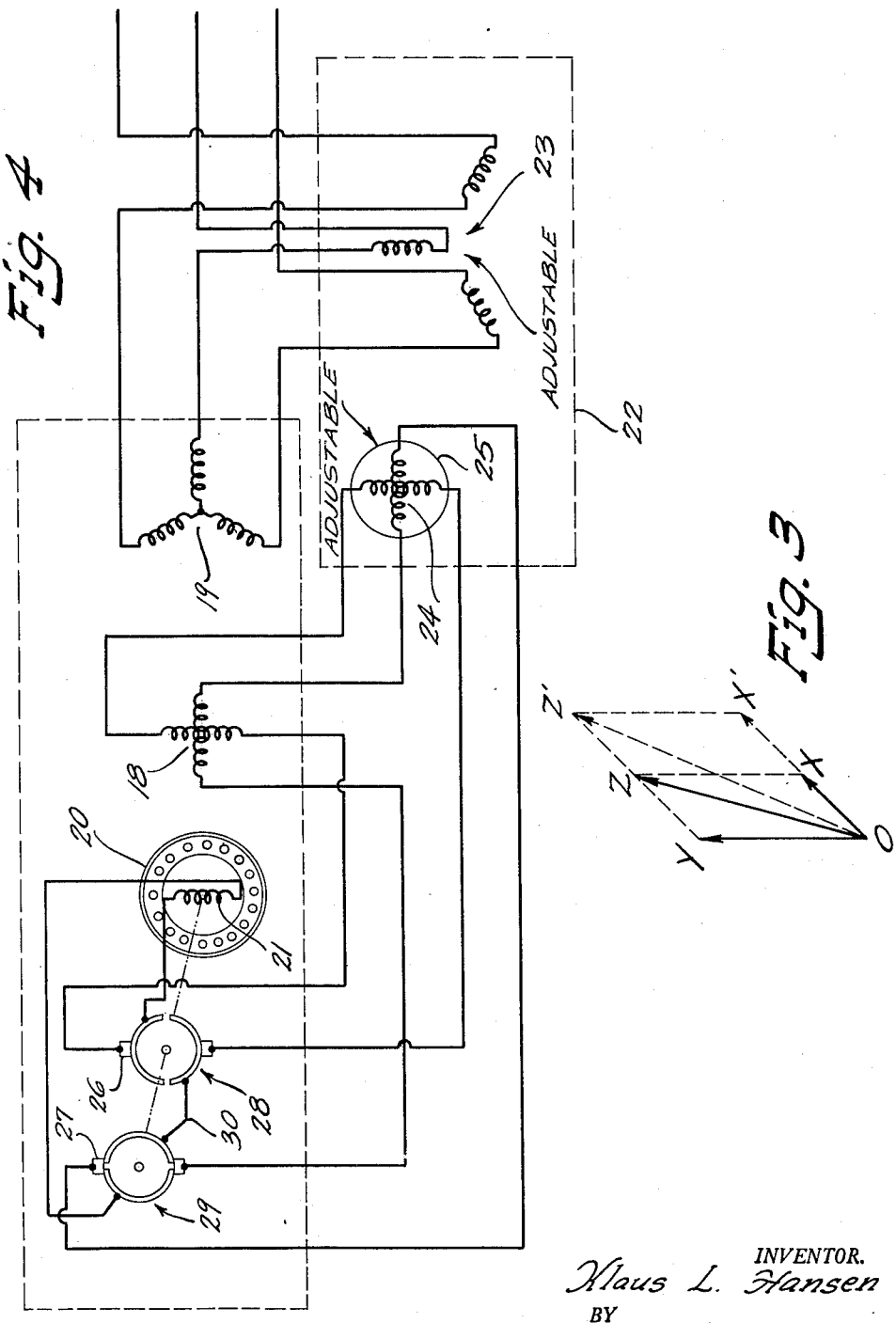

Patented Dec. 23, 1952

2,623,201

UNITED STATES PATENT OFFICE 2,623,201

SYNCHRONOUS MOTOR

Klaus L. Hansen, Milwaukee, Wis.

Application August 5, 1950, Serial No. 177,928

6 Claims. (Cl. 318—186)

This invention relates to synchronous motors.

Objects of this invention are to provide a self-starting and self-compensating synchronous motor whose characteristics can be utilized to correct certain defects now existing in distribution, generating, and transforming equipment, while at the same time, providing a highly novel synchronous motor having characteristics directly adapting the motor for use in competition with the conventional type of induction motors.

It has long been recognized that reactive currents circulating in power circuits and windings of machines constitute a tremendous waste of energy. Furthermore, the capacity of generating, transforming and transmitting equipment must be sufficient to handle the parasitic reactive load in addition to the useful power load. Were all wattless currents eliminated, it is conservatively estimated that 25 per cent more load could be generated and transmitted with present equipment.

Recognition of the appalling waste engendered by the reactive k. v. a. in power circuits has led to installation of capacitors. At best, however, it is only a makeshift solution. Capacitors do not provide for automatic neutralization of the reactive component with load. To achieve even approximate adjustment to changing load conditions requires an elaborate system of switches. Furthermore, correction of power factor at one point of a plant layout does not eliminate wasteful wattless currents in the plant circuits. Low power factor should be corrected at the source.

However, in spite of its relatively high power factor, the general purpose induction motor constitutes by far the greatest source of wattless currents in power lines because of the tremendous amount of connected load. The general purpose induction motor has to be not only tolerated but compensated for by other means since it is in such extensive use.

Further objects are to provide a synchronous motor which is relatively inexpensive to make as compared with the cost of the conventional type of synchronous motor and which may be made at much less cost than such conventional synchronous motor and which further can be made at a cost competitive with that of the conventional induction motor in practically all sizes, even in small sizes.

Further objects are to provide a self-starting and self-compensating synchronous motor which has a high starting torque per ampere, and which will pull in at synchronism in a smooth manner without the use of switches or any auxiliary equipment whatsoever.

Further objects are to provide a synchronous motor which combines in itself the excellent starting and accelerating characteristics of the induction motor with the desirable performance of the synchronous motor when operating at synchronous speed.

Further objects are to provide a self-compensating, self-starting synchronous motor which has unity power factor or definitely leading power factor at all loads which needs only substantially the same starting equipment as an induction motor and in which the design and construction of the synchronous motor is much simplified because small air gaps can be employed.

Embodiments of the invention are shown in the accompanying drawings, in which:

Figure 1 is a diagrammatic view showing one form that the invention may take where the field of the synchronous motor is supplied through a synchronous rectifier from a transformer having both series and potential primary windings.

Figure 2 is a diagrammatic and fragmentary detail showing a portion of the transformer used with the equipment of Figure 1.

Figure 3 is a vector diagram showing the voltage induced in the secondary windings of the transformer at no load and with increasing loads.

Figure 4 is a view of a further form of the invention in which the potential transformer is built into the stator of the synchronous motor.

Figure 5:
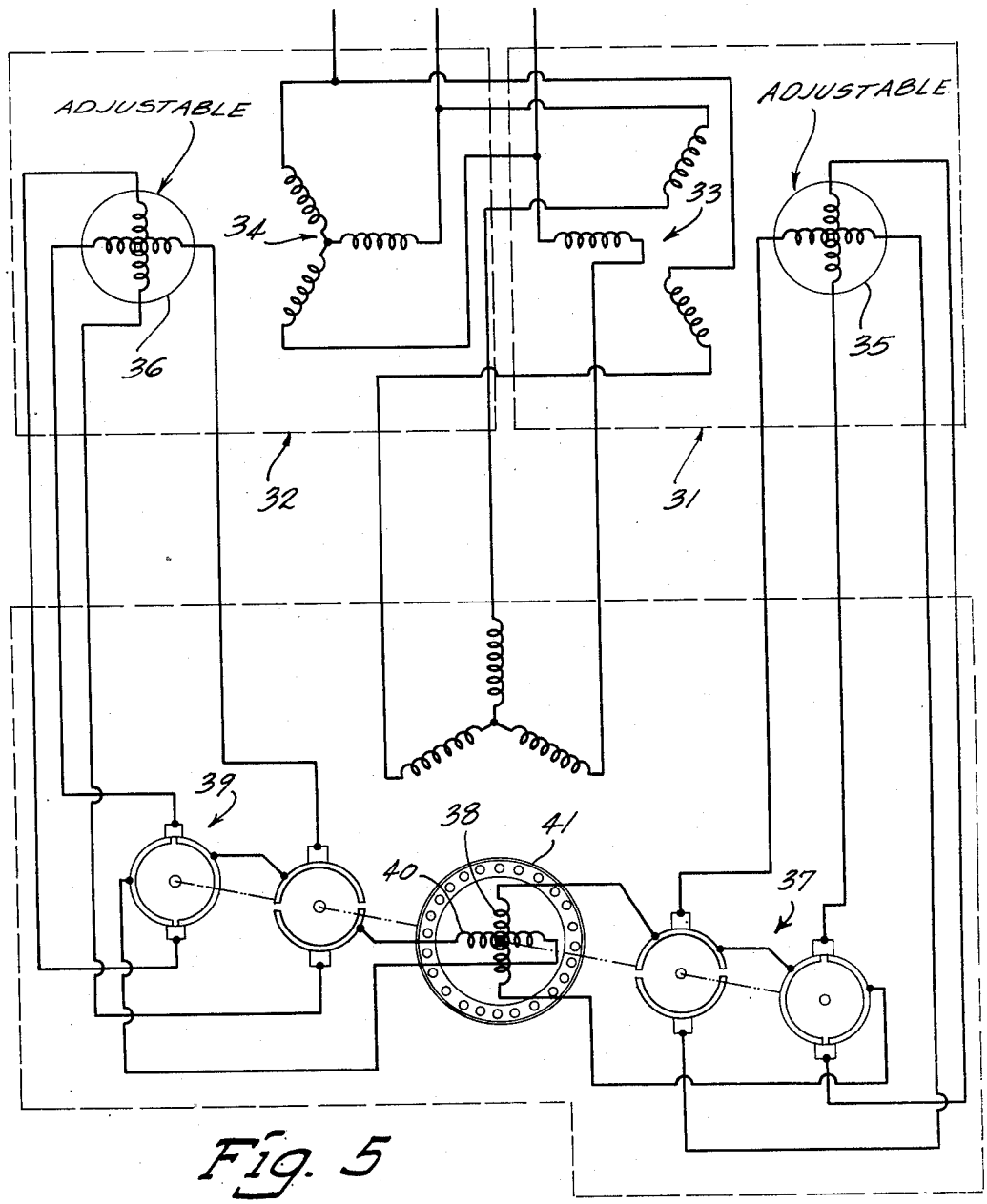
Figure 5 is a view of a further form of the invention in which a separate potential and a separate series transformer supply the displaced field coils of the rotor.

Referring to the drawings, particularly Figures 1, 2, and 3, where the first form of the invention is illustrated, it will be seen that the reference character 1 indicates generally a synchronous motor and the reference character 2 a particular form of transformer. The synchronous motor is provided with a polyphase stator winding indicated generally by the reference character 3 which, in the instance shown, is three phase. It is also provided with a squirrel cage rotor, preferably of high resistance so as to secure excellent starting characteristics. The rotor of the synchronous motor is indicated by the reference character 4 and is provided with a field winding 5 and is rigidly connected to a pair of two-segment commutators 6 and 7. It is to be noted that one segment of each of the commutators are connected together as indicated at 8 and that the other two segments are connected to opposite sides of the field winding 5 of the rotor. The segments of the commutators 6 and 7 are arranged at right angles to each other as will be seen from Figure 1 and pairs of brushes 9 and 10 bear on the commutators 6 and 7.

The brushes 9 are supplied from the winding 11 on the stationary rotor or core member 12 of the special transformer 2 and the brushes 10 are supplied from the other secondary winding 13 on the rotor 12. It is to be noted that the secondaries of the rotor 12 are wound for two phase. Obviously, any number of phases could be used if desired with the corresponding change in the number of the commutators 6 and 7.

The primary of the special transformer 2 consists of a polyphase potential primary winding 14 and a polyphase series winding 15. The rotor is stationary and the primary windings are stationary. However, there is an initial adjustment permitted for the rotor 12, whereby it may be rotated to secure the exact phase angle desired for the secondary windings. In addition to this, one or both of the primary windings 14 or 15 may be adjustable. The series winding 15 has been indicated as adjustable.

At this point, attention is directed to Figure 2 which shows schematically the special transformer 2. The windings 11 and 13 are diagrammatically indicated and the primary windings 14 and 15 are similarly diagrammatically indicated. The cores for the primary windings 14 and 15 are indicated by the reference characters 16 and 17. It is intended, as stated, that the rotor be revolubly adjustable initially and thereafter locked in place so as to secure the exact relation desired between it and the primary windings 14 and 15. Also it is intended that the primary winding 15 be rotatably adjustable about the axis of the rotor 12, so that any adjustment desired can be obtained.

In Figure 3 the vector diagram of the voltages impressed on the rectifier at no load and at gradually increasing load have been indicated. The line O—Y shows the voltage impressed on the rectifier due to the primary winding 14 and the line O—X indicates the voltage impressed on the rectifier due to the primary winding 15 or series winding at no load. The voltage O—Y is the highest voltage that will ever be impressed on the field of the synchronous motor due to the potential winding. The resultant voltage indicated by the line O—Z is the vector sum of the voltages O—Y and O—X. The condition shown in full lines and described thus far is under no load conditions. However, as the load increases the increments in the load produces correspondingly increased voltages impressed on the series primary winding 15 as shown, for instance, by the line O—X'. The vector sum is now indicated by the line O—Z'.

To state this in other words, it is pointed out that at no load the current supplied the motor is small and the rotating magnetic field of the primary 15 of the transformer is weak. The primary 14 of the transformer induces the voltage in the secondary having a predetermined unchanging value. However, at no load the weak rotating field due to the primary 15 induces only a small voltage in the secondary whereas the field current at no load will set up a high counter E. M. F. The voltage induced by the shunt or potential primary 14 encounters a high self-induction as the secondary passes under the primary 15 and is, therefore, limited to a relatively low value. However, as the current in the primary 15 increases, it reduces this value of self-induction and, therefore, permits more current to flow through the secondary winding and, therefore, increases the field current of the synchronous motor.

Furthermore, the primary 15 is so placed relatively to the primary 14 that there is an increasing lag in the phase of the resultant voltage in the secondary as the load increases. This is necessary to offset the change in relative position of the segments of the rectifier as the load on the synchronous motor increases due to the increase in the torque angle or distortion angle of the synchronous motor.

Substantially the same effect can be produced by winding a separate secondary 18 directly on the stator itself. The secondary 18 may be two phase, as shown, in order to simplify the construction of the rectifier or may have any number of phases depending on the number of commutators employed. This is described in my prior Patent 2,460,006 of January 25, 1949 for Rectifier and Transformer Unit. The stator winding of the synchronous motor is indicated at 19 in Figure 4, the rotor at 20 and the field winding of the rotor at 21.

In this form of the invention, a separate, special transformer 22 is provided and is a transformer having the series primary winding indicated generally by the reference character 23. The secondary of the transformer 22 is indicated by the reference character 24 and is wound on the stationary rotor 25. The rotor 25, as well as the series primary winding 23, may be adjustable.

The secondaries 18 and 24 are connected in series and to the brushes 26 and 27 of the commutators 28 and 29. These commutators are two segment commutators with a pair of segments connected as indicated at 30 and with the other pair of segments connected to opposite sides of the field winding 21 of the synchronous motor. Obviously, the same vector relation of voltages may be had in this form of the invention as that previously described for the first form and indicated in Figure 3 of the drawings.

It is to be understood that the field winding of the rotor may be a distributed winding or it may be a winding for a rotor having salient poles, though the distributed winding is preferable. The coils of the distributed winding in order not to have a poor distribution factor are omitted from several slots in the center of the pole as they add very little to the M. M. F. of the D. C. winding. The idle slots can be used to an advantage by placing low resistance, squirrel cage bars in the unused slots and connecting them by heavy end rings. This does not in any way interfere with the high resistance cage of the rotor.

If desired, the rotor may be geared to the commutators so as to reduce the number of segments required for the commutators in the event the stator has a large number of poles. In this case, however, suitable slip rings would have to be employed in addition to the commutators.

When the resisting torque varies periodically, the angular velocity of the conventional synchronous motor undergoes periodic alterations which give rise to a tendency to hunt. There is some tendency to hunt in the synchronous motors hereinabove described and illustrated in Figures 1 and 4, but to a lesser degree than conventional synchronous motors and particularly so when non-salient poles are employed. However, a different manner of eliminating this tendency to hunt due to periodic variations in the load with resulting periodic variations in the displacement angle may be accomplished by the means shown in Figure 5.

In the form of the invention shown in Figure 5, separate potential and series transformers are employed. The series transformer is indicated generally by the reference character 31 and the potential transformer by the reference character 32. The primary of the series transformer is indicated at 33 and the primary of the potential transformer is indicated at 34. The secondaries may be wound for any number of phases, for example, two phases for the sake of simplicity as previously explained. In this form of the invention the stationary, initially adjustable rotor of the series transformer is indicated at 35 and the stationary, initially adjustable rotor of the potential transformer is indicated at 36. The synchronous motor is provided with two sets of synchronous rectifiers, each set being connected as previously described. One set, namely, that indicated generally by the reference character 37, is supplied from the secondaries of the series transformer 31 and supplies the field winding 38 of the rotor 41 of the synchronous motor. The field winding 40 is supplied through the commutators 39 from the secondaries of the potential transformer 32. These field windings 38 and 40 are electrically at right angles and thus produce a resultant field composed of the two M. M. F. vectorially added. In this form of the invention, the potential transformer feeds a relatively light field winding through its rectifier and furnishes the no load excitation. The series transformer feeds a heavier field winding through its rectifier. This last mentioned field winding which is displaced 90 electrical degrees from the other field winding furnishes the ampere turns necessary to neutralize the increasing magnetification of the stator. It will be observed with increasing load the center of the M. M. F. of the rotor moves through an angle sufficient to offset what would ordinarily be the displacement angle of a synchronous motor.

In all forms of the invention, a high resistance squirrel cage rotor is provided. As the squirrel cage is not depended on to furnish any appreciable amount of torque in the upper range of the speed torque curve, it is, as stated, of high resistance to increase the starting torque and limit the inrush current. Also it is to be noted that the air gaps in the magnetic circuit may be greatly reduced below that of the conventional synchronous motor.

It will be seen that a novel form of synchronous motor has been provided by this invention which is self-starting and self-compensating, which has a high starting torque several times that of the conventional synchronous motor and a high accelerating torque and an excellent pull-in characteristic with automatic smooth transition into synchronism.

The synchronous motor is self-compensating and will provide a unity or a definitely leading power factor at all times depending on the adjustment and design of the machine. Further, it is to be noted that this invention makes it possible to provide a more economical design because smaller air gaps in the magnetic circuit are employed and also it is to be noted that very simple starting equipment, such as used for an ordinary squirrel cage motor may be employed.

Advantages of this invention become more apparent when the following detailed examination of the conditions existing at starting, during acceleration, and when pulling into synchronism are made.

Assume that full line voltage is applied at starting. The torque and current are determined mainly by the resistance of the cage during the starting period. At full frequency the induced voltage in the D. C. field is high, but the resistance voltage is also high, so the net voltage and current are nominal. At starting, the voltage impressed by the transformer is too low in proportion to the induced and reactance voltages to have any appreciable influence.

At standstill the voltage impressed on the field by the transformer is of line frequency. As the motor accelerates, this voltage is converted by the rectifier to slip frequency and thus combines with the induced voltage to produce the resultant current. The influence of the impressed voltage is inappreciable during the early stages of acceleration, but increases in importance as the motor speeds up, especially as it approaches synchronism.

In the conventional synchronous motor the cage is depended on to bring the motor close to synchronism before applying the D. C. voltage. This requires a low resistance cage when the resisting torque is appreciable and a low resistance cage means low starting torque. When the D. C. voltage is applied, an alternating torque of slip frequency is superimposed on the torque developed by the cage.

In order that the motor should synchronize, a torque peak, minus the resisting torque, must be sufficient to accelerate the inertia load in less than half cycle of slip frequency. The average torque developed by the cage may be referred to as steady torque and obviously becomes zero as the speed approaches very close to synchronism.

The motor under discussion differs from the conventional synchronous motor in that the steady torque does not become zero at any time but has a definite value as the motor approaches and pulls into synchronism when an alternating voltage of slip frequency is impressed on the field. At synchronism the external voltage impressed is automatically converted to D. C.

It is to be noted particularly that this synchronous motor is self-compensating because of a novel means of compensating for the torque angle shift on the one hand, and on the other hand, of preventing any torque angle shift. Both of these results are accomplished by arranging two magnetic fields at right angles to each other with one of the fields responding to the voltage impressed on the motor and the other responding to the current demanded by the motor as the load comes on.

In the first two forms of the invention, there is a phase shift of the rotating magnetic field in the transformer which phase shift corresponds to the torque angle shift of the rotor. This maintains commutation at the segments of the synchronous rectifier at zero voltage at all loads. In the last form of the invention where the rotor has two fields at right angles electrically to each other, there is a phase shift in the magnetic field of the rotor itself corresponding to what would be the torque angle shift of the rotor so that the net result is no torque angle shift and commutation is maintained at zero voltage.

In other words, the brushes pass over the gaps in their respective commutators while the voltage curve is passing through zero in all forms of the invention, and compensation is secured for all changes in loads to thereby maintain commutation at zero voltage.

Compensation is also secured in that as the load increases, the field strength increases and thus unity or a definite leading power factor is obtained at all loads depending on the design or adjustment of the device.

Excellent self-starting characteristics are secured by having the cage of high resistance and excellent running characteristics at synchronous speeds are obtained due to the manner in which the field is controlled. To express this in other words, in the first two forms of the invention, the phase angle shift due to changing loads is obtained in the special transformers while in the other form of the invention, the phase angle shift is obtained in the magnetic field of the rotor of the synchronous motor.

Although this invention has been described in considerable detail, it is to be understood that such description is intended as illustrative rather than limiting, as the invention may be variously embodied and is to be interpreted as claimed.

I claim:

1. A self-compensating synchronous motor comprising two elements consisting of a stator and a rotor, one of said elements being provided with a polyphase winding and the other of said elements being provided with field winding means, synchronous rectifier means driven from said rotor and having segments connected to the field winding means and provided with brushes, and transformer means having its secondary connected to said brushes, whereby said commutator and brushes constitute means for supplying direct current to the field winding means when said rotor is at synchronous speed and whereby said rectifier means converts line frequency to the frequency induced in said field winding means during starting and acceleration prior to the time that said rotor attains synchronous speed, said transformer means having a polyphase series and potential primary.

2. A self-compensating synchronous motor comprising two elements consisting of a stator and a rotor, one of said elements being provided with a polyphase winding and the other of said elements being provided with field winding means, synchronous rectifier means driven from said rotor and having segments connected to the field winding means and provided with brushes, and transformer means having its secondary connected to said brushes whereby said commutator and brushes constitute means for supplying direct current to the field winding means when said rotor is at synchronous speed and whereby said rectifier means converts line frequency to the frequency induced in said field winding means during starting and acceleration prior to the time that said rotor attains synchronous speed, said transformer means having a polyphase series and potential primary, said transformer means having its secondary and primary windings arranged for relative adjustment.

3. A self-compensating synchronous motor comprising two elements consisting of a stator and a rotor, one of said elements being provided with a polyphase winding and the other of said elements being provided with field winding means, synchronous rectifier means driven from said rotor and having segments connected to the field winding means and provided with brushes, and transformer means having its secondary connected to said brushes, whereby said commutator and brushes constitute means for supplying direct current to the field winding means when said rotor is at synchronous speed and whereby said rectifier means converts line frequency to the frequency induced in said field winding means during starting and acceleration prior to the time that said rotor attains synchronous speed, said transformer means having a polyphase series and potential primary, said transformer means having its secondary and primary windings arranged for relative adjustment, and at least one of said primary windings being adjustable with reference to the other of said primary windings.

4. A self-compensating synchronous motor comprising a stator having a polyphase stator winding and rotor having a squirrel cage and a direct current winding, a secondary winding wound on said stator in transformer relation to the stator winding, a transformer having a secondary winding and a series primary winding, the secondary windings being connected together, and synchronous rectifier means driven from said rotor and connected to said secondaries and to said direct current field winding for supplying direct current to said field winding, the said secondaries having their voltages vectorially added, whereby the shift in the phase angle of the current supplied said direct current field winding corresponds to the torque shift of said synchronous motor thereby resulting in commutation at substantially zero potential irrespective of load conditions imposed on said motor.

5. A self-compensating synchronous motor comprising a stator having a polyphase winding and a rotor having a squirrel cage and a direct current winding, synchronous rectifier means driven from said rotor for supplying said field winding with direct current, and transformer means having a polyphase primary consisting of two parts, one of which is a series primary and the other of which is a potential primary and having a polyphase secondary connected to said synchronous rectifier for supplying direct current through said synchronous rectifier to the direct current field winding of said rotor, the polyphase secondary winding having a plurality of windings having their voltage vectorially added, whereby the shift in the phase angle of the current supplied said direct current field winding increases with increasing load imposed on the said synchronous motor.

6. A self-compensating synchronous motor comprising a stator having a stator winding, a rotor having two direct current field windings arranged electrically at right angles to each other, a series transformer having a primary connected in series with the stator windings and having secondary winding means, a first synchronous rectifier having segments connected to one of said direct current windings and having brushes connected to the secondary winding means of said series transformer, a second transformer consisting of a potential transformer having a primary connected in shunt to said stator winding and having secondary winding means, and a second synchronous rectifier having segments connected to the second direct current field winding of said rotor and having brushes bearing on said segments and connected to the secondary winding means of said second transformer.

KLAUS L. HANSEN.

REFERENCES CITED

The following references are of record in the file of this patent:

UNITED STATES PATENTS

| Number | Name | Date |
|---|---|---|
| 2,146,778 | Swanson | Feb. 14, 1939 |